US012353272B2

(12) United States Patent
Sonntag et al.

(10) Patent No.: US 12,353,272 B2
(45) Date of Patent: Jul. 8, 2025

(54) ERROR LOGGER CIRCUIT

(71) Applicant: Apple Inc., Cupertino, CA (US)

(72) Inventors: Soeren Sonntag, Haar (DE); Vanja Rados, San Rafael, CA (US); Constantin Daniel Ciortescu, Taufkirchen (DE); Mirko Sauermann, Neubiberg (DE); Matthias Heink, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/072,243

(22) Filed: Nov. 30, 2022

(65) Prior Publication Data

US 2024/0103952 A1    Mar. 28, 2024

Related U.S. Application Data

(60) Provisional application No. 63/409,569, filed on Sep. 23, 2022.

(51) Int. Cl.
*G06F 11/00* (2006.01)
*G06F 11/07* (2006.01)

(52) U.S. Cl.
CPC ........ *G06F 11/0772* (2013.01); *G06F 11/076* (2013.01); *G06F 11/0778* (2013.01)

(58) Field of Classification Search
CPC ............... G06F 11/0772; G06F 11/076; G06F 11/0778; G06F 11/1679; G06F 3/0659
See application file for complete search history.

(56) References Cited

U.S. PATENT DOCUMENTS

| | | | |
|---|---|---|---|
| 6,446,224 B1 | 9/2002 | Chang et al. | |
| 7,243,264 B2 * | 7/2007 | Weber ..................... | H04L 69/40 714/25 |
| 7,280,620 B2 * | 10/2007 | Kajita .................. | G06F 11/263 714/25 |
| 7,890,682 B2 * | 2/2011 | Kamimura ............... | G11C 7/10 710/305 |
| 8,327,187 B1 * | 12/2012 | Metcalf ................. | H04L 49/109 714/10 |
| 9,317,636 B1 * | 4/2016 | Petras ..................... | G06F 30/33 |
| 9,749,448 B2 * | 8/2017 | Guddeti ............... | H04L 1/0082 |
| 9,880,896 B2 | 1/2018 | Coteus et al. | |
| 10,482,943 B2 | 11/2019 | Chun et al. | |
| 10,754,760 B1 | 8/2020 | Levy et al. | |
| 10,819,680 B1 * | 10/2020 | Santan ................ | H04L 63/0209 |

(Continued)

*Primary Examiner* — Loan L. T. Truong
(74) *Attorney, Agent, or Firm* — Sterne, Kessler, Goldstein & Fox P.L.L.C.

(57) ABSTRACT

The present disclosure describes a device including an initiator, a target, a communication bus coupling the initiator to the target over a channel, a functional circuit, and an error logger circuit. The functional circuit is coupled to the channel and can perform a function associated with a transaction request from the initiator to the target. The functional circuit can include an error detection circuit to detect an error associated with the function performed by the functional circuit and to generate an error indicator signal to indicate that the error has been detected. The error logger circuit can be coupled to the functional circuit, in which the error logger circuit is configured to receive the error indicator signal from the error detection circuit and store information about the error.

20 Claims, 9 Drawing Sheets

(56) References Cited

U.S. PATENT DOCUMENTS

| | | | |
|---|---|---|---|
| 11,314,609 B2 | 4/2022 | Rafey | |
| 2005/0144532 A1* | 6/2005 | Dombrowa | G06F 11/3495 714/39 |
| 2006/0104209 A1* | 5/2006 | De Araujo | G06F 11/0757 370/242 |
| 2006/0248411 A1* | 11/2006 | Kirscht | G06F 11/076 714/704 |
| 2012/0036341 A1* | 2/2012 | Morfey | G06F 9/48 712/E9.035 |
| 2016/0162376 A1* | 6/2016 | Errickson | G06F 11/0706 714/19 |
| 2016/0299808 A1* | 10/2016 | Yoshida | G06F 7/764 |
| 2017/0132083 A1* | 5/2017 | Aslot | G06F 11/073 |
| 2018/0307430 A1* | 10/2018 | Iturbe | G06F 11/1076 |
| 2019/0073257 A1* | 3/2019 | Dasgupta | G06F 16/258 |
| 2019/0317910 A1* | 10/2019 | Ching | G06F 13/24 |
| 2020/0177554 A1 | 6/2020 | Moore | |
| 2021/0271537 A1 | 9/2021 | Gong et al. | |
| 2022/0027520 A1* | 1/2022 | Li | G06F 11/0772 |
| 2023/0051943 A1* | 2/2023 | Oster | G01R 31/318572 |
| 2023/0195551 A1* | 6/2023 | Krishnamurthy | G06F 11/1679 714/48 |
| 2023/0315572 A1* | 10/2023 | Sheffield | G06F 9/3009 714/15 |
| 2023/0386598 A1* | 11/2023 | Yoo | G06F 11/076 |

* cited by examiner

ERROR LOGGER CIRCUIT

CROSS REFERENCES

This application claims the benefit of U.S. Provisional Application No. 63/409,569 filed Sep. 23, 2022, titled "Error Logger Circuit," the content of which is herein incorporated by reference in its entirety.

FIELD

The present disclosure relates to an error logger circuit for a device including a communication bus.

BACKGROUND

An error log is a record of issues in a device, application, operating system, network, server, or other combination of hardware and software. The error log can include information about the time and location of the issues, a user associated with the issues, system components impacted by the issues, a time duration of the issues, or any other relevant information. With this information, the error log can be used to debug errors in a computing system.

SUMMARY

Embodiments of the present disclosure include a device that includes an error logger circuit coupled to a channel of a communication bus and a functional circuit. The device can include an initiator, a target, and a communication bus coupling the initiator to the target over a channel. The functional circuit coupled to the channel can perform a function associated with a transaction request from the initiator to the target. The functional circuit can include an error detection circuit to detect an error associated with the function performed by the functional circuit and generate an error indicator signal to indicate that an error has been detected. An error logger circuit can be coupled to the channel and the functional circuit, and configured to receive the error indicator signal from the error detection circuit and store information about the error. The information about the error can include one or more of an error type, a source address of the transaction request, a destination address of the transaction request, a communication bus state, and an identification of the functional circuit (e.g., such as a physical location of the error detection circuit). Accordingly, the error logger circuit can be in a state indicating no error is logged, a state indicating an error is logged, or a state indicating a first error and other errors are logged.

In some embodiments, the error logger circuit can further include a counter configured to count a number of errors associated with the function and detected by the error detection circuit. The error logger circuit can store the information about the error, and the counter can count the number of other errors associated with the function and detected by the error detection circuit. In some embodiments, the error logger circuit can further include an interruption circuit configured to assert an error event, such as an interrupt signal, to be sent to the initiator at a same clock cycle as the transaction request is sent to another component over the channel. In some embodiments, the interrupt signal is sent to another component which is not the initiator of the transaction. In some embodiments, the error logger circuit can further receive a configuration signal to enable reading the information about the error or to clear the information about the error. In some embodiments, the error logger circuit can be a target itself and a transaction request can be used to read the content of the error logger circuit, e.g., the logged information about the error.

In some embodiments, the error logger circuit can be coupled to another channel of the communication bus and configured to receive another error indicator signal from another error detection circuit and store information about another error detected by the other error detection circuit. The error logger circuit can be coupled to another functional circuit and configured to receive another error indicator signal from another error detection circuit and store information about the other error detected by the other error detection circuit. In some embodiments, the functional circuit can further include an error shim circuit configured to terminate the transaction request and generate a transaction response in response to the error being detected by the error detection circuit.

Embodiments of the present disclosure include an error logger circuit. The error logger circuit can include an error indicator receiving port configured to receive an error indicator signal from an error detection circuit coupled to a channel of a data communication bus coupling an initiator and a target. The error detection circuit can detect an error associated with a function for a transaction request from the initiator to the target and generate an error indicator signal to indicate that the error has been detected. The error logger circuit can further include an input port configured to receive information about the error associated with the function performed by the functional circuit for the transaction request. The error logger circuit can further include a storage circuit, and a controller coupled to the error indicator receiving port, the input port, and the storage circuit. The controller can enable the error logger circuit when the error indicator signal is received from the error detection circuit through the error indicator receiving port, and further store to the storage circuit the information about the error received through the input port.

Embodiments of the present disclosure further include a method performed by an error logger circuit. The method can include receiving an error indicator signal from an error detection circuit coupled to a channel of a data communication bus coupling an initiator and a target. The error detection circuit can detect an error associated with a transaction request between the initiator and target and generate the error indicator signal to indicate that the error has been detected and to enable the error logger circuit. The method can further include receiving an error message including information about the error associated with the function performed by the functional circuit for the transaction request. The method can further include storing the received information about the error, and transmitting an interrupt signal to the initiator at a same clock cycle as the transaction request is sent to a component over the channel. In some embodiments, when there is no error, the transaction request is further sent downstream to the next component over the channel. In some embodiments, when there is an error, transaction request is terminated and a transaction response with an error indicator set can be sent back upstream over the channel to the initiator.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
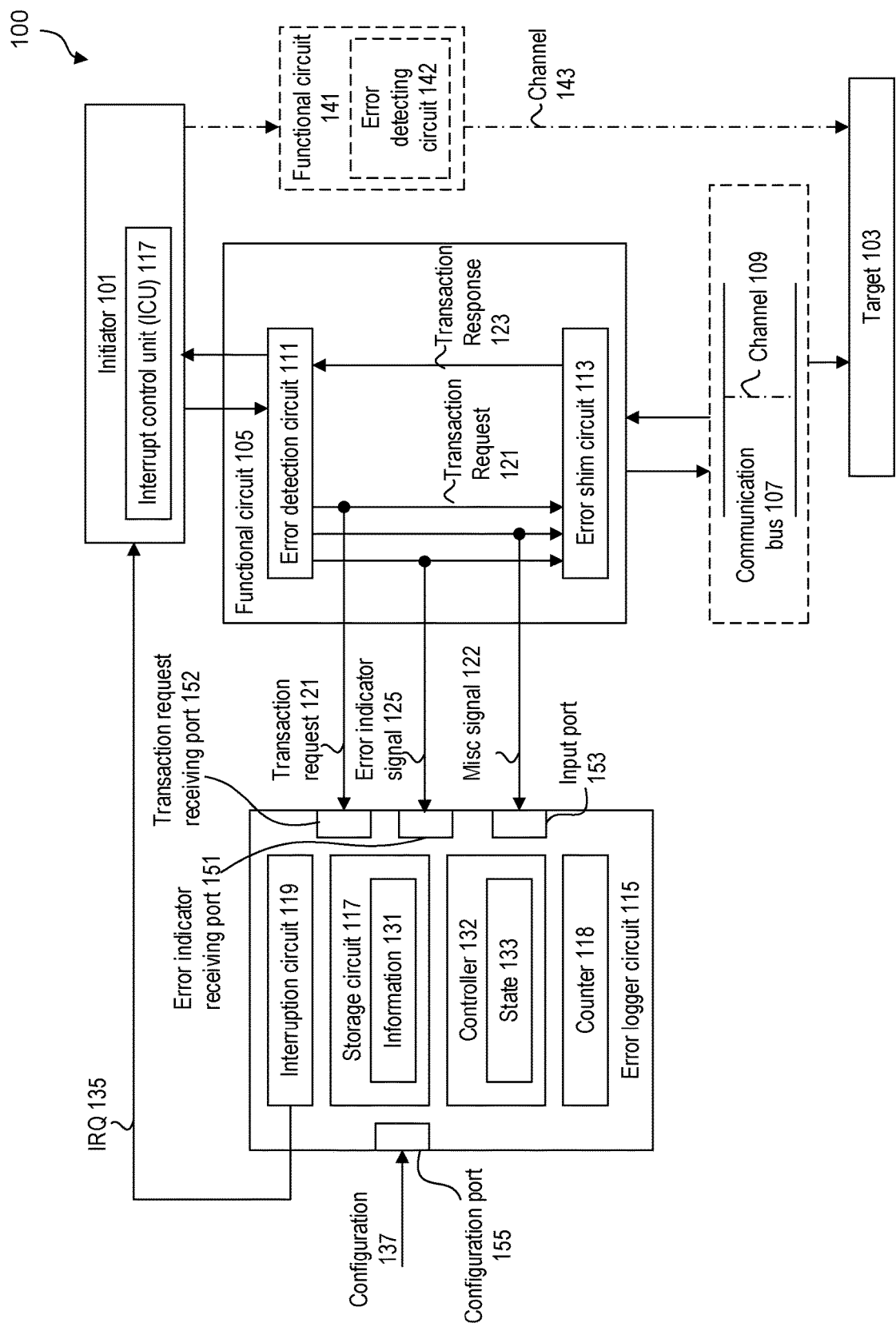
FIG. 1 is an illustration of an electronic device including an error logger circuit coupled to a channel of a communication bus, according to some embodiments.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

Different types of communication infrastructure include a computing bus, a communication bus, an on-chip data communication network, a network on chip (NoC), and other suitable types of buses. A communication bus can be on a single chip, on multiple chips in a computing device, or between computing devices. A communication bus can include hardware components (e.g., wire, optical and fiber components) and software components (e.g., communication protocols). In some embodiments, a communication bus can include an advanced microcontroller bus architecture (AMBA) bus, such as an advanced eXtensible interface (AXI) bus, an advanced high-performance bus (AHB), an advanced peripheral bus (APB), a universal serial bus (USB), an open core protocol (OCP) bus, a peripheral component interconnect express (PCIe) bus, or any other suitable communication bus. An error log is a record and information of issues in a device, application, operating system, network, server, communication bus, or any combination thereof. The error log can include details about the time and location of the issues, a user associated with the issues, system components impacted by the issues, and a time duration of the issues. With this information, the error log can be used in software programming and the debugging process.

Embodiments herein are directed to a device or an electronic system that includes an error logger circuit coupled to a channel of a communication bus and a functional circuit. The device can be a system on chip (SoC) including multiple initiators (e.g., central processing units (CPUs)) and targets (e.g., memory devices), which are interconnected via an on-chip data communication network, such as communication busses or Networks on Chip (NoC). The initiators and targets can be electrically connected by demultiplexers to connect one initiator to multiple targets and by multiplexers to connect multiple initiators to one target. The demultiplexers and multiplexers are examples of functional circuits. The number and placement of the demultiplexers and multiplexers can form a topology of a communication network or a communication bus. Transaction requests can be sent by the initiator to the target, while transaction responses can be sent from the target to the initiator. Error logger or error logging capability can be implemented in the communication bus, according to some embodiments. In some embodiments, the initiators and/or targets cannot process error information.

Embodiments herein are also directed to a device including an error logger circuit for on-chip communication networks or communication buses. The error logger circuit can be implemented as a circuit separate from a functional circuit on the communication bus. In some embodiments, the error logger circuit can operate independently of communication bus protocols, such that the error logger circuit can be implemented in a similar way for any type of communication bus protocol. The device can include an initiator, a target, and a communication bus coupling the initiator to the target over a channel. The functional circuit can be coupled to the channel to perform a function associated with a transaction request from the initiator to the target. The functional circuit can include an error detection circuit to detect an error associated with the function performed by the functional circuit and to generate an error indicator signal to indicate that the error has been detected.

The error logger circuit can be a separate circuit coupled to the channel and the functional circuit to receive the error indicator signal from the error detection circuit and to store information about the error to indicate that an error has been logged to another instance (e.g., initiator). The error logger circuit can capture relevant information of the transaction request causing the error. In addition, the error logger circuit can simplify the error response handling in the initiator since no transaction history has to be stored. The error is indicated by the error detection circuit of the functional circuit to the error logger circuit at the time when the error occurs, which reduces the delay time compared to other approaches. In addition, the error detection circuit can be coupled to the functional circuit to provide the location and error type information, in contrast to an unspecific error response provided by network protocols of other communication buses. Embodiments presented herein can be applicable to various communication bus protocols, such as AXI, AHB, APB, OCP, PCIe, or other communication buses. Furthermore, embodiments herein can have a small footprint compared to other error logger implementations by sharing one error logger circuit with multiple interfaces, multiple functional circuits, and/or multiple channels.

FIG. 1 is an illustration of an electronic device 100 including an error logger circuit 115 coupled to a channel 109 of a communication bus 107, according to some embodiments. Electronic device 100 includes communication bus 107 coupling an initiator 101 to a target 103 over channel 109, a functional circuit 105 coupled to channel 109, and error logger circuit 115 coupled to channel 109 and functional circuit 105. In some embodiments, functional circuit 105 is a part of channel 109. In some other embodiments, functional circuit 105 can be separated from channel 109. In addition, electronic device 100 can further include an additional channel 143 and a functional circuit 141, which can be coupled to initiator 101 and target 103. Channel 143 is shown as an example and is not limiting. In some embodiments, channel 143 can be coupled to a different initiator or a different target, which are not shown in FIG. 1.

In some embodiments, functional circuit 105 can perform a function associated with a transaction request 121 from initiator 101 to target 103. Functional circuit 105 can include an error detection circuit 111 and an error shim circuit 113. Error detection circuit 111 can detect an error associated with the function performed by functional circuit 105 and generate an error indicator signal 125 to indicate that the error has been detected. Error detection circuit 111 can also generate a miscellaneous signal 122. Information in miscellaneous signal 122 may be referred to as a message or an error message. Error detection circuit 111 can generate error indicator signal 125 in the same clock cycle as transaction request 121 is sent to the next component in a downstream direction (e.g., to the target) of channel 109. Transaction request 121 is sent if valid and ready signals are both asserted in the same clock cycle. In some embodiments, transaction request 121 is sent if transaction request 121 is available (valid) and the receiver or next downstream component is ready to receive (ready). In some embodiments, error shim circuit 113 can either forward transaction request 121 further downstream along channel 109 if no error indicator is set or terminate transaction request 121 and generate transaction response 123 in response to the error being detected by error detection circuit 111.

In some embodiments, functional circuit 105 can include a demultiplexer, a security circuit, a multiplexer, a power circuit, or any other functional circuit related to the function performed for transaction request 121. Initiator 101 can include a processor, a memory access circuit, a hardware accelerator, a network circuit, or any other suitable circuit. Transaction request 121 can include a read request, a write request, a coherency request, or any other suitable transaction request. Target 103 can include a dynamic random access memory (DRAM), a static random access memory (SRAM), a register file, a hardware queue storage device (e.g., a hardware first-in-first-out (FIFO) device), a content addressable memory (CAM), or any other suitable circuit.

In some embodiments, error logger circuit 115 is coupled to channel 109 and functional circuit 105. Error logger circuit 115 can include an error indicator receiving port 151, a transaction request receiving port 152, an input port 153, a configuration port 155, a storage circuit 117, a controller 132, a counter 118, an interruption circuit 119, and any other circuits or components to perform functions described herein. The number of ports and the components are shown for example purposes. There can be multiple ports, such as multiple input ports for error logger circuit 115. In some embodiments, there can be fewer components or ports as shown, where the functions of two ports can be implemented by one port. For example, information in miscellaneous signal 122 received through input port 153 can be received by transaction request 121 through transaction request receiving port 152. Information contained in miscellaneous signal 122 can include transaction request details. Error logger circuit 115 can receive transaction request 121 through transaction request receiving port 152. Input port 153 can provide transaction request details to error logger circuit 115. Error logger circuit 115 can receive error indicator signal 125 from error detection circuit 111 through error indicator receiving port 151, where error indicator signal 125 can enable error logger circuit 115. Error logger circuit 115 can store information 131 about the error, where information 131 can be included in miscellaneous signal 122 received through input port 153. Storage circuit 117 can include registers to log the transaction request details. In some embodiments, when there are multiple errors detected by error detection circuit 111, only the first error, which is the error being detected first before other errors being detected, may be logged. By logging only the first error, the storage space needed to store the information about the first error can be reduced compared to storing information about multiple errors. In addition, since other errors may be caused by the first error, logging only the first error may not negatively impact the debugging of multiple errors.

Contents of the registers of storage circuit 117 can remain stable until the error is cleared by, for example, software operating on electronic device 100 and using communication bus 107. In some embodiments, with multiple register sets, multiple errors can be logged. Counter 118 can count the number of errors logged. In some embodiments, only the first error may be logged in detail by the registers of storage circuit 117, while subsequent errors are just counted. Interruption circuit 119 can assert an interrupt signal 135 if at least one error has been logged. In some embodiments, interruption circuit 119 of error logger circuit 115 can assert interrupt signal 135 to be sent to initiator 101. In some embodiments, interrupt signal 135 can be any error event. When configuration signal 137 is received through configuration port 155, configuration signal 137 can allow software operating on electronic device 100 to read the error registers and clear error logger circuit 115. In some embodiments, software operating on electronic device 100 can read the error registers or clear error logger circuit 115 without configuration signal 137.

In some embodiments, controller 132 can set error logger circuit 115 in a state 133, which can be a state indicating no error is logged, a state indicating one error is logged, or a state indicating multiple errors are logged. In the state indicating no error is logged (e.g., the number of logged errors is 0), interrupt signal 135 can be de-asserted. The other registers of storage circuit 117 do not contain valid data. The state indicating no error is logged can be the state after reset of error logger circuit 115. In the state indicating that one error is logged (e.g., the number of logged errors is 1), interrupt signal 135 is asserted. The other registers of storage circuit 117 contain the details of the logged error (e.g., information 131). In the state indicating multiple errors are logged, counter 118 can show the number of logged errors until counter 118 saturates, interrupt signal 135 is asserted. The other registers of storage circuit 117 contain the details of the first logged error. In some embodiments, there can be a clear register used to clear the error and to reset error logger circuit 115 to the state indicating no error is logged such that it will be ready to log further errors. In some embodiments, the number of logged errors may not be important because subsequent errors are related to the first error. If the first error is resolved, the subsequent errors may likely disappear as well. Accordingly, error logger circuit 115 can be in one of the three states to indicate if errors have occurred or not (e.g., normal operation). When there are multiple errors detected, counter 118 can provide an overview or estimate of the number of errors, without storing the accurate details of the errors, since such accurate details may be of secondary relevance.

In some embodiments, counter 118 of error logger circuit 115 can count a number of errors associated with the function performed by functional circuit 105 and detected by error detection circuit 111. Error logger circuit 115 can solely store information 131 about the error in storage circuit 117 for a single error, according to some embodiments. In addition, counter 118 can count the number of other errors associated with the function performed by functional circuit 105 and detected by error detection circuit 111. In some embodiments, information about the other errors (e.g., errors subsequent to the first error) may not be stored in storage circuit 117. Accordingly, with information 131 about a first error is stored and information about other subsequent errors not stored, embodiments herein can save the storage space and improve the speed of reading the stored information from memory. In addition, as discussed above, the other subsequent errors may be caused by the first error. Therefore, the information provided by information 131 about the first error can be redundant to information about the other subsequent errors.

In some embodiments, error detection circuit 111 can detect the error based on the transaction details (e.g., destination address) or communication network state (e.g., powered-off target). Information 131 about the error can include one or more of an error type, a source address of the transaction request, a destination address of the transaction request, a communication bus state, and an identification of the functional circuit. An error type can be selected from a decode error, a security error, a disconnect error (e.g., a power disconnect error), a slave error, or any other error type defined by a communication bus protocol. In some embodiments, there can be multiple types of errors and various ways to detect them. A decode error can be detected if a destination address of a transaction request is not mapped to any target. When a decode error is detected, a bit (e.g., a DECERR bit) can be flagged. Decode errors can be reported by a functional circuit, such as a demultiplexer. A security error can be detected when a security filter detects a request is not allowed to access the destination. A disconnect error can be detected when powered-off blocks could return an error upon access. The disconnect error might be generated by a power-disconnect component in lieu of the powered-off block. A slave error can be detected if a target is not capable or unable to perform transaction request 121, which may be presented by flagging a SLVERR bit. A slave error can occur if a write transaction request is sent to a read-only register or if a transaction request is destined to a non-mapped register address in the target's address space.

In some embodiments, interruption circuit 119 of error logger circuit 115 can assert interrupt signal 135 to be sent to initiator 101 at a same clock cycle as the transaction request 121 is sent to a next component over channel 109. Interrupt signal 135 can be connected to interrupt control unit (ICU) 117 of initiator 101. Error logger circuit 115 can further receive a configuration signal 137 to enable reading information 131 about the error or to clear information 131 about the error.

In some embodiments, to improve the space efficiency in comparison with an error logger circuit coupled to each error detection circuit, error logger circuit 115 can be coupled to channel 143 of communication bus 107 and configured to receive another error indicator signal from another error detection circuit 142 in another functional circuit 141 and to store information about another error detected by the other error detection circuit 142. Error logger circuit 115 can be coupled to another functional circuit 141 and configured to receive another error indicator signal from another error detection circuit 142 and store information about another error detected by the other error detection circuit.

Figure 2:
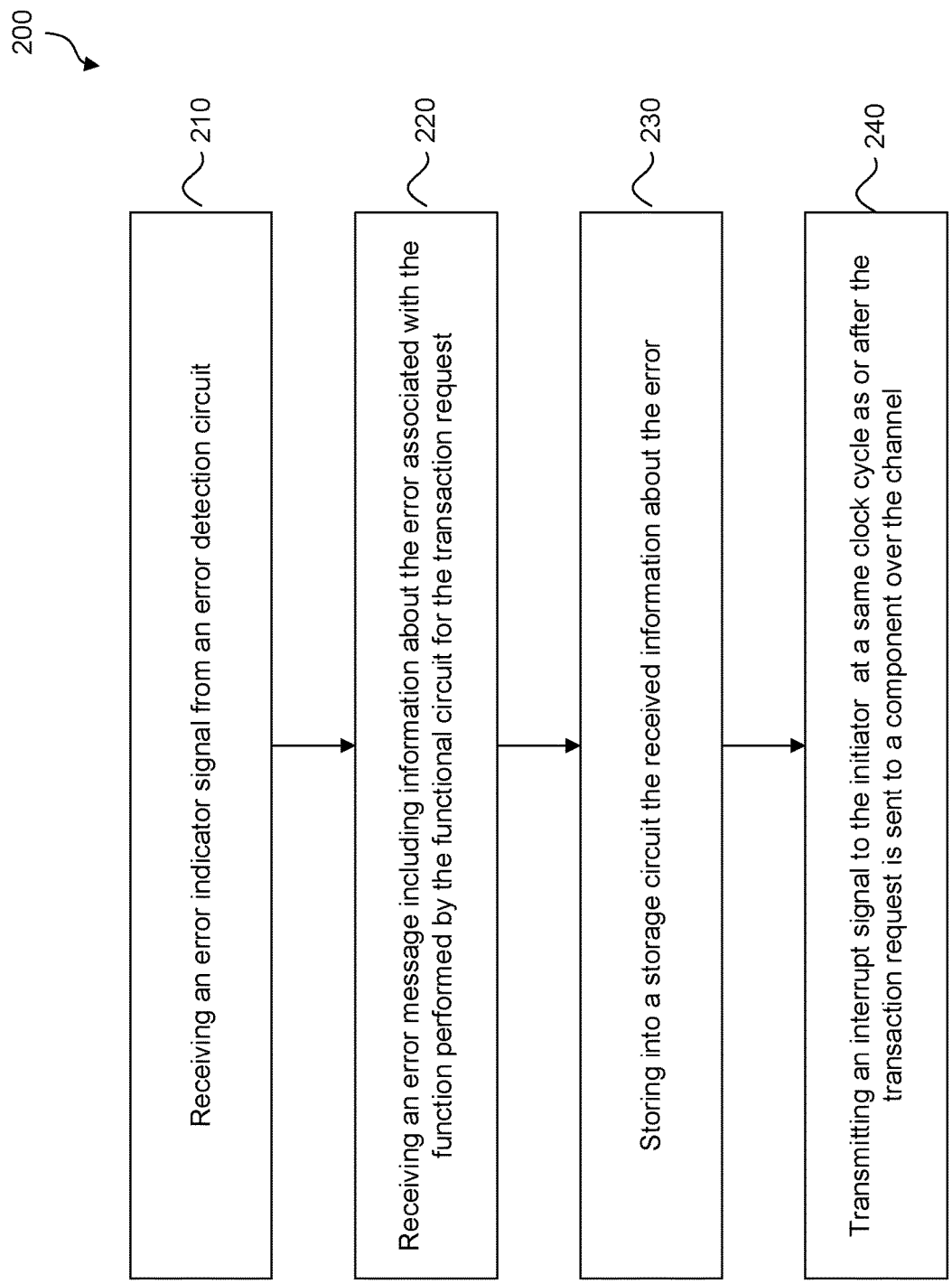
FIG. 2 is an illustration of a method using an error logger circuit coupled to a channel of a communication bus, according to some embodiments.

In some embodiments, as shown in FIG. 2, error logger circuit 115 can perform operations illustrated in method 200. FIG. 2 is an illustration of method 200 using an error logger circuit coupled to a channel of a communication bus, according to some embodiments. For illustrative purposes, the operations illustrated in method 200 will be described with reference to error logger circuit 115 shown in FIG. 1. Other representations of error logger circuit, such as error logger circuits in FIGS. 3A-3D and FIG. 4, are within the scope of the present disclosure. Also, additional operations may be performed between various operations of method 200 and may be omitted merely for clarity and ease of description. The additional operations can be provided before, during, and/or after method 200, in which one or more of these additional operations are briefly described herein. Moreover, not all operations may be needed to perform the disclosure provided herein. Additionally, some of the operations may be performed simultaneously or in a different order than shown in FIG. 2. In some embodiments, one or more other operations may be performed in addition to or in place of the presently-described operations.

At operation 210, error logger circuit 115 can receive error indicator signal 125 from error detection circuit 111 of functional circuit 105 coupled to channel 109 of communication bus 107 coupling initiator 101 and target 103. Functional circuit 105 performs a function for transaction request 121 from initiator 101 to target 103 through channel 109. Error detection circuit 111 detects an error associated with the function performed by functional circuit 105 for transaction request 121 and generate error indicator signal 125 to indicate that the error has been detected and to enable error logger circuit 115.

At operation 220, error logger circuit 115 can receive miscellaneous signal 122 including information 131 about the error associated with the function performed by functional circuit 105 for transaction request 121. Information 131 can be included in miscellaneous signal 122 received through input port 153.

At operation 230, error logger circuit 115 can store, in storage circuit 117, information 131 about the error. Storage circuit 117 can include registers to log the transaction request details. In some embodiments, when there are multiple errors detected by error detection circuit 111, only the first error, which is the error being detected first before other errors being detected, is logged. Contents of the registers can remain stable until the error is cleared by software operating on electronic device 100. In some embodiments, with multiple register sets, multiple errors can be logged.

At operation 240, error logger circuit 115 can transmit interrupt signal 135 to initiator 101 at a same clock cycle as transaction request 121 is sent to a downstream or an upstream component over channel 109. In some embodiments, when there is no error, transaction request 121 is further sent downstream to the next component over channel 109. In some embodiments, when there is an error, transaction request 121 can be terminated and a transaction response with an error indicator set, such as BRESP or RRESP in the case of AXI, can be sent back upstream over channel 109 to initiator 101. In some embodiments, interrupt signal 135 can be sent to a different component of electronic device 100 or to multiple components of electronic device 100. In some embodiments, interrupt signal 135 can be sent one clock cycle or multiple clock cycles after the clock cycle transaction request 121 is sent to a downstream or an upstream component over channel 109. In some embodiments, interruption circuit 119 of error logger circuit 115 can assert interrupt signal 135 to be sent to initiator 101.

FIGS. 3A-3D are illustrations of error logger circuits, such as an error logger circuit 315, an error logger circuit 345, and an error logger circuit 365, according to some embodiments. Error logger circuit 315, error logger circuit 345, and error logger circuit 365 are examples of error logger circuit 115 and perform similar functions as described above for error logger circuit 115, such as operations described in method 200. Although the overall techniques described herein are protocol independent, AXI protocol is used in FIGS. 3A-3D as an example. In some embodiments, an AXI bus can include separated and independent read and write channels, allowing read and write transactions to be processed concurrently. In addition, the AXI protocol can allow two types of error codes: DECERR for decode errors and SLVERR for slave errors. These error responses are sent in the transaction response. However, the AXI protocol has limited information available in the response transaction, making it difficult for a user to debug the system. Accordingly, the error logger circuits described herein can improve AXI bus performance.

Figure 3A:
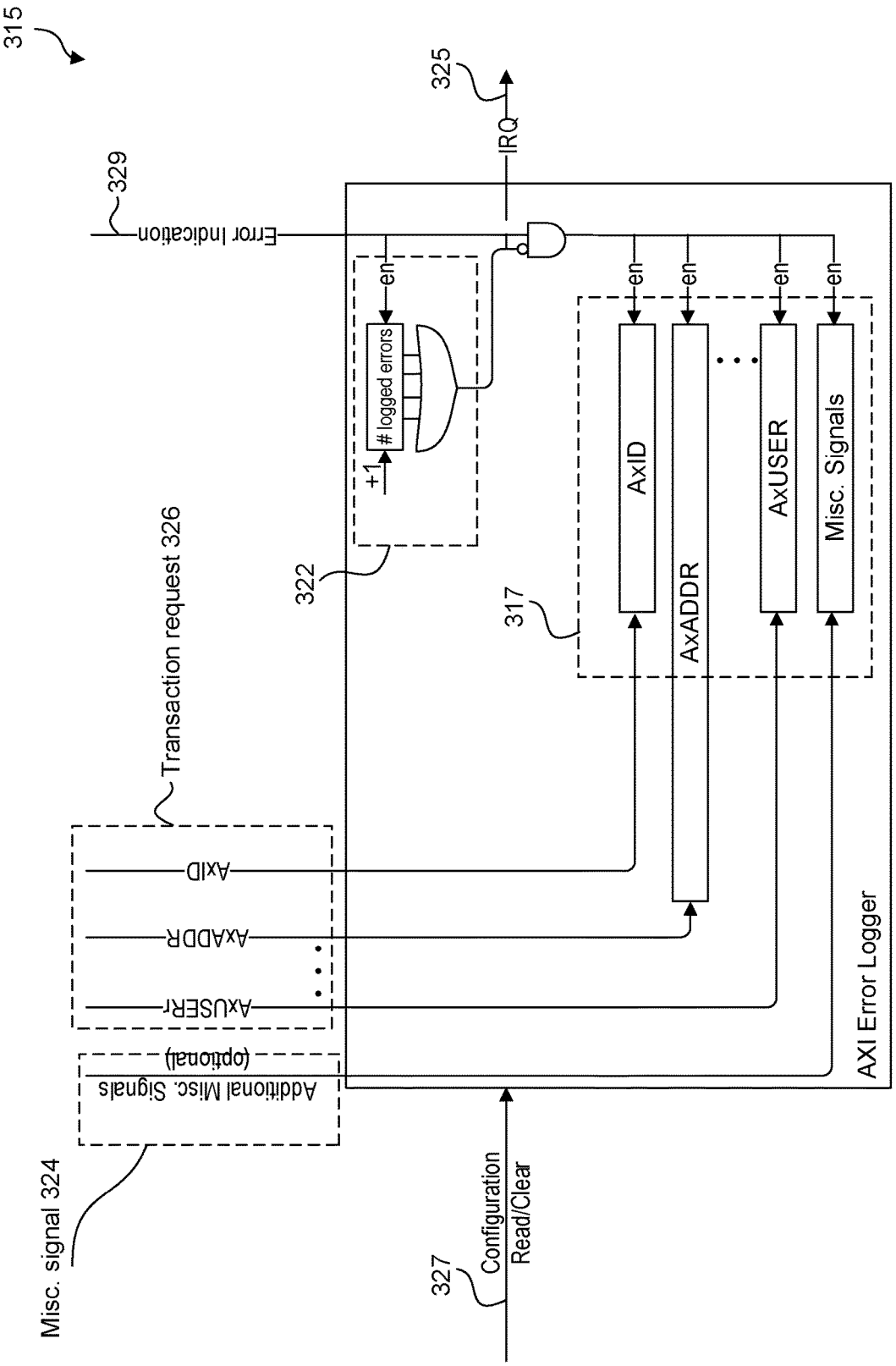
FIGS. 3A-3D are illustrations of error logger circuits, according to some embodiments.

In some embodiments, as shown in FIG. 3A, error logger circuit 315 can include a storage circuit 317 having multiple registers, a controller 322 that includes a selector. Error logger circuit 315 can receive an error indicator signal 329 to enable error logger circuit 315, transaction request 326 (including information about the error to be stored in registers of storage circuit 317), and additional miscellaneous signal 324. Error logger circuit 315 can receive a configuration signal 327 to enable reading the information about the error in error message 326, where reading the information about the error may also clear the information about the error. Error logger circuit 315 can further generate an interrupt signal 325.

In some embodiments, storage circuit 317, controller 322, error indicator signal 329, transaction request 326, configuration signal 327, additional miscellaneous signal 324, and interrupt signal 325 are examples of storage circuit 117, controller 132, error indicator signal 125, transaction request 121, configuration signal 137, additional miscellaneous signal 122, and interrupt signal 135 of FIG. 1, respectively. Error logger circuit 315 is used for a single channel, either the read channel or write channel, which is denoted by "Ax" in FIG. 3A, according to some embodiments.

Figure 3B:
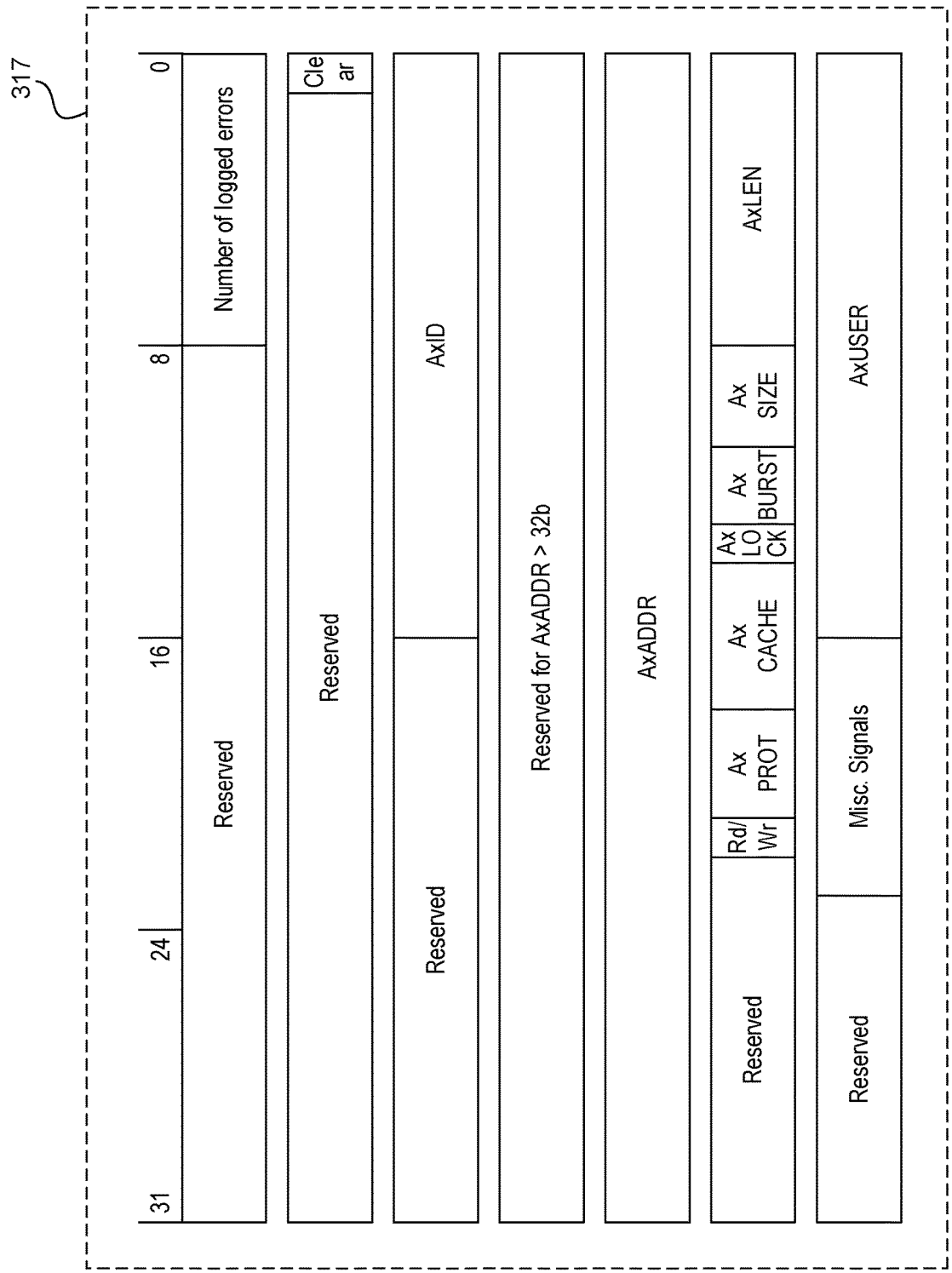

In some embodiments, as shown in FIG. 3B, registers in storage circuit 317 are shown. Various registers are included in storage circuit 317 to store an identification of the functional circuit as "AxID," a source address of the transaction request or a destination address of the transaction request as "AxADDR." Other information may be stored in the registers, such as the identification of a user-specific signal as "AxUSER," the size of the transaction request 121 as "AxSIZE," among other types of information. Different implementations or communication bus protocols may store different details.

Figure 3C:
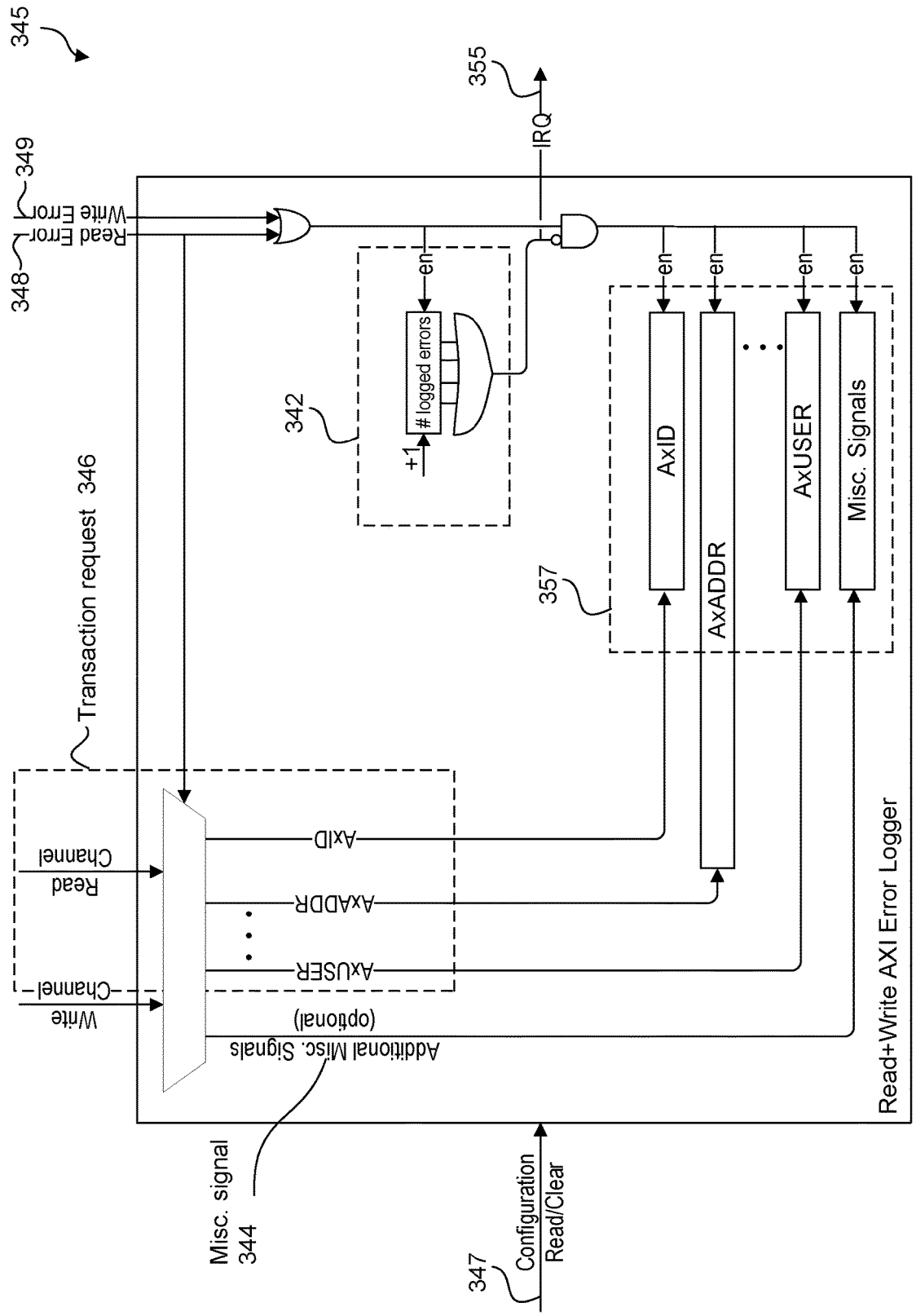

In some embodiments, as shown in FIG. 3C, error logger circuit 345 can include a storage circuit 357 and a controller 342. Error logger circuit 345 can receive an error indicator signal 348 for a read channel and an error indicator signal 349 for a write channel, either error indicator signal 348 or error indicator signal 349 can enable error logger circuit 345. Error message 346 includes information about the error and can be received from either the read channel or the write channel. Information about the error in error message 346 can be stored in registers of storage circuit 357. Error logger circuit 345 can receive a configuration signal 347 to enable reading the information about the error in error message 346, in which the information is stored in registers of storage circuit 357. Error logger circuit 345 can further generate an interrupt signal 355.

In some embodiments, storage circuit 357, controller 342, error indicator signal 348 or error indicator signal 349, transaction request 346, additional miscellaneous signal 344, configuration signal 347, and interrupt signal 355 can be examples of storage circuit 117, controller 132, error indicator signal 125, transaction request 121, additional miscellaneous signal 122, configuration signal 137, and interrupt signal 135 of FIG. 1, respectively.

In embodiments, error indicator signal 348 for the read channel or error indicator signal 349 for the write channel can share the same error logger circuit 345. Because there may be a low probability of multiple errors occurring in the same clock cycle, error logger circuit 345 multiplexes the read and write channels of one AXI bus together to save circuit area space. Sharing one error logger circuit for multiple channels can be implemented in other communication protocols as well. For example, for a PCIe bus, multiple channels (e.g., a Posted channel, a Non-Posted channel, and a Completion channel) can be multiplexed in a similar way as shown for error logger circuit 345 in FIG. 3C.

In some embodiments, read and write errors can occur at the same time in the AXI domain due to separate read and write request channels. If multiple errors have to be handled in the same clock cycle, the read error can take precedence over the write error (or vice versa). When such conflicts arise in the same clock cycle, only the error with precedence is logged.

Figure 3D:
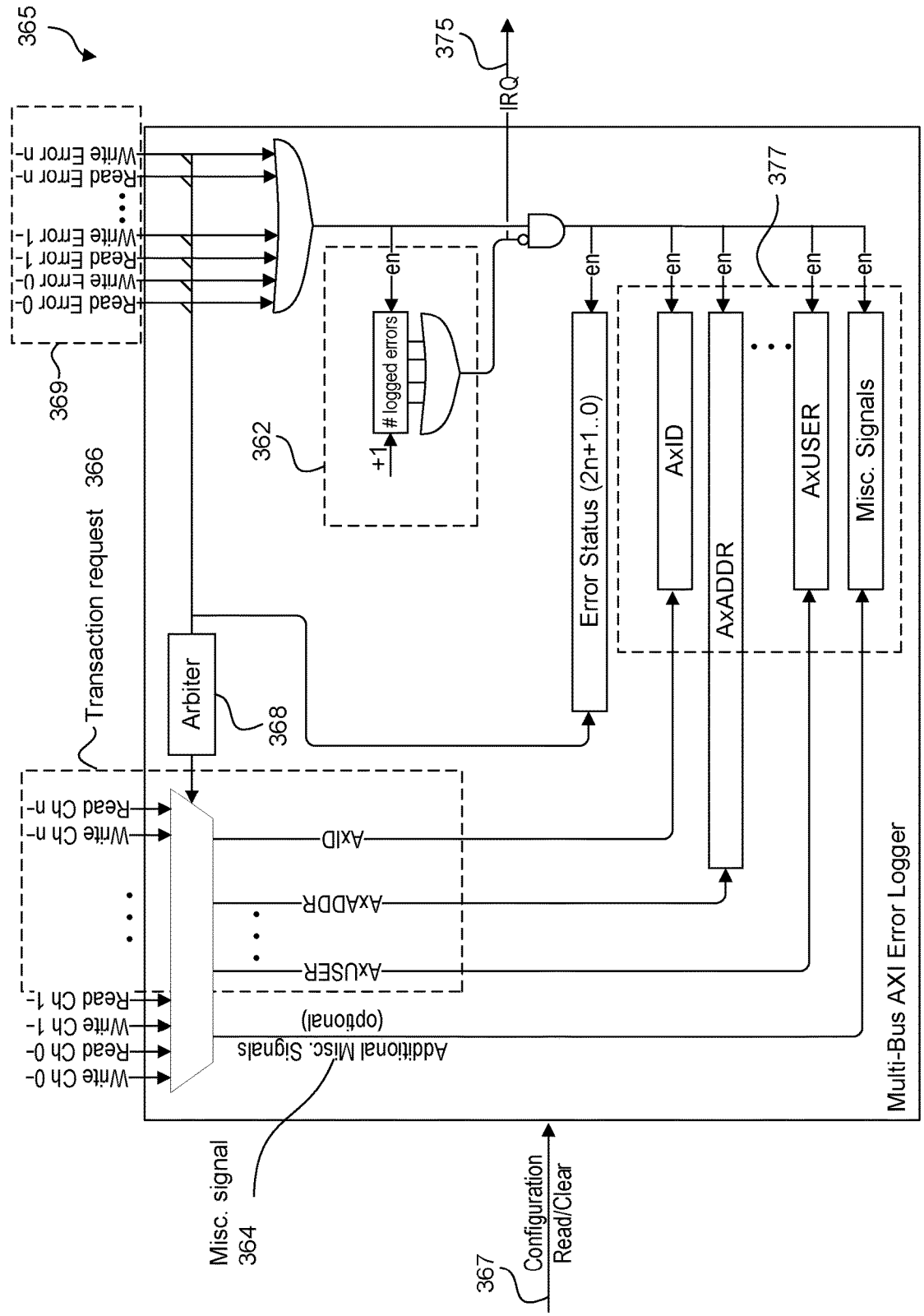

In some embodiments, as shown in FIG. 3D, error logger circuit 365 can include a storage circuit 377 and a controller 362. Error logger circuit 365 can receive multiple error indicator signals 369 from multiple channels, among which one can be selected to enable error logger circuit 365. Transaction request 366 (including error messages) can be received from multiple channels, among which one can be similarly selected based on an arbiter 368 that coordinates the selection of the error indicator signal. The selected transaction request can include information about the error to be stored in registers of storage circuit 377. Error logger circuit 365 can receive a configuration signal 367 to enable reading the information about the error in error message 366. Error logger circuit 365 can further generate an interrupt signal 375.

In some embodiments, storage circuit 377, controller 362, error indicator signal 369, transaction request 366, additional miscellaneous signal 364, configuration signal 367, and interrupt signal 375 can be examples of storage circuit 117, controller 132, error indicator signal 125, transaction request 121, additional miscellaneous signal 122, configuration signal 137, and interrupt signal 135 of FIG. 1, respectively. In some embodiments, storage circuit 377 can include error status registers.

In some embodiments, error logger circuit 365 can be shared by multiple error detection circuits along multiple channels on one or more AXI busses. A transaction request can be selected by an arbiter that is controlled by the error indicator input ports. The number of input ports can depend on wiring and timing. Relevant AXI channels can be connected as input sources. Read and write channels can be mixed in any fashion. The arbiter selects the input port which is logged in case multiple errors occur at the same time. The input port number (e.g., the relevant AXI channel) is logged to identify the error source. In some embodiments, all error indicators can be logged. Hence, it can be recognized which error indicators showed an error (e.g., a single error or multiple errors). Only the error with highest priority is logged, in which the logged error is visible from the same register (e.g., highest bit which is set), according to some embodiments.

Figure 4:
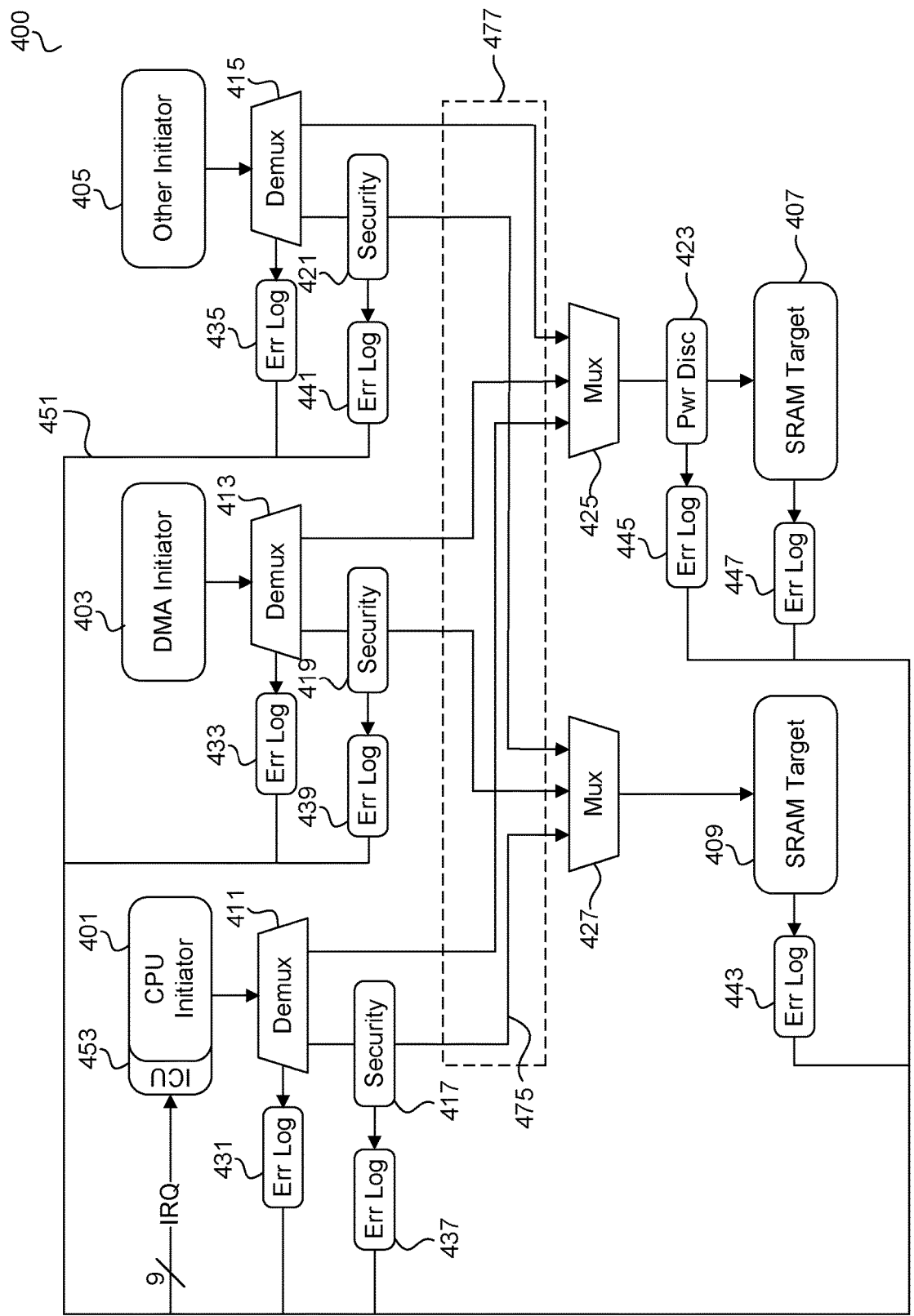
FIG. 4 is an illustration of an electronic device including error logger circuits coupled to channels of a communication bus, according to some embodiments.

FIG. 4 is an illustration of an electronic device 400 including error logger circuits coupled to channels 475 of a communication bus 477, according to some embodiments. Communication bus 477 couples multiple initiators, such as an initiator 401, an initiator 403, an initiator 405, to multiple targets, such as a target 407 and a target 409. Even though communication bus 477 is referred as a bus, it may include a communication network configured by multiple multiplexers, such as a multiplexer 425 and a multiplexer 427, and by multiple demultiplexers, such as a demultiplexer 411, a demultiplexer 413, and a demultiplexer 415, so that a target can be coupled to multiple initiators, and an initiator can be coupled to multiple targets. A multiplexer or a demultiplexer can be a component of a channel coupling an initiator and a target. An initiator, such as initiator 401, initiator 403, and initiator 405, can be a CPU, Direct memory access (DMA), or other components or circuits. A target, such as target 407 and target 409, can be a DRAM, SRAM, or other circuits.

In some embodiments, demultiplexer 411, demultiplexer 413, demultiplexer 415, multiplexer 425, and multiplexer 427 can be an example of a functional circuit of a channel. In addition, there can be other functional circuits, such as a security circuit 417, a security circuit 419, and a security circuit 421, along the channels or data paths of communication bus 477. A security circuit, such as security circuit 417, security circuit 419, and security circuit 421, can be used to grant or deny access to one of the targets. In addition, a power disconnect circuit 423 can be placed in front of the SRAM target to enable the power connection or disconnection of the target and to controls its isolation. Security circuits and power disconnect circuit 423 are also examples of functional circuits.

In some embodiments, error detection and reporting are an important way to stabilize electronic device 400. Different errors are detected and reported back to the initiator as part of the transaction response. There can be limited information available in the response transaction, making it challenging to debug the system. In some systems, an initiator may store the information about errors. Not all initiators behave similarly when processing errors. Some initiators store the complete request information, others just stop working upon an error response without providing sufficient information for debugging, while other initiators may ignore the error. When an initiator supports multiple outstanding transaction requests, the initiator may store a significant amount of information just in case an error response is later received for one of these transactions.

Different from storing error information by an initiator, embodiments herein include separate error logger circuits, such as an error logger circuit 431, an error logger circuit 433, an error logger circuit 435, an error logger circuit 437, an error logger circuit 439, an error logger circuit 441, an error logger circuit 443, an error logger circuit 445, and an error logger circuit 447, each coupled to a functional circuit. These error logger circuits shown in FIG. 4 can be coupled to individual functional circuits and record various specific errors, such as a decode error for a demultiplexer, a security error for a security circuit, a power disconnect error for power disconnect circuit 423, and a slave error for a target. Since the error logger circuits shown in FIG. 4 are separate from the functional circuits on a communication bus, the error logger circuits can be implemented and applicable to any communication bus. In addition to valid error responses, the error logger circuits can include information to identify the erroneous transaction. Hence, error logger circuits shown in FIG. 4 implements a unified, protocol independent error handling technique that enables reliable, convenient, and effective error debugging of electronic systems.

In some embodiments, the error logger circuits shown in FIG. 4 can be coupled to an interrupt signal 451 if at least one error has been logged. Interrupt signal 451 can be coupled to an ICU 453 in initiator 401. In some other embodiments, interrupt signal 451 can be coupled to other initiators as well. As shown in FIG. 4, the error logger circuits are coupled to interrupt signal 451 that is connected to ICU 453 of the CPU, which is initiator 401. Interrupt signal 451 can enable an interrupt assertion as soon as an error is logged within the same clock cycle. In some systems, the communication bus protocol can also implement the interrupt assertion along the channel of the communication bus. However, such interrupt assertion along the channel of the communication bus may take multiple (e.g., tens or hundreds of) clock cycles since the transaction request may be terminated first, and a transaction response may be created and sent back to the initiator. On the other hand, initiator 401 can recognize the causative error logger circuit by the interrupt number and can access the particular error logger circuit via its configuration port to read the detailed error information and to clear the logger. With the error logger circuit, electronic device 400 can react much quicker to errors and save valuable information about the system state.

Figure 5:
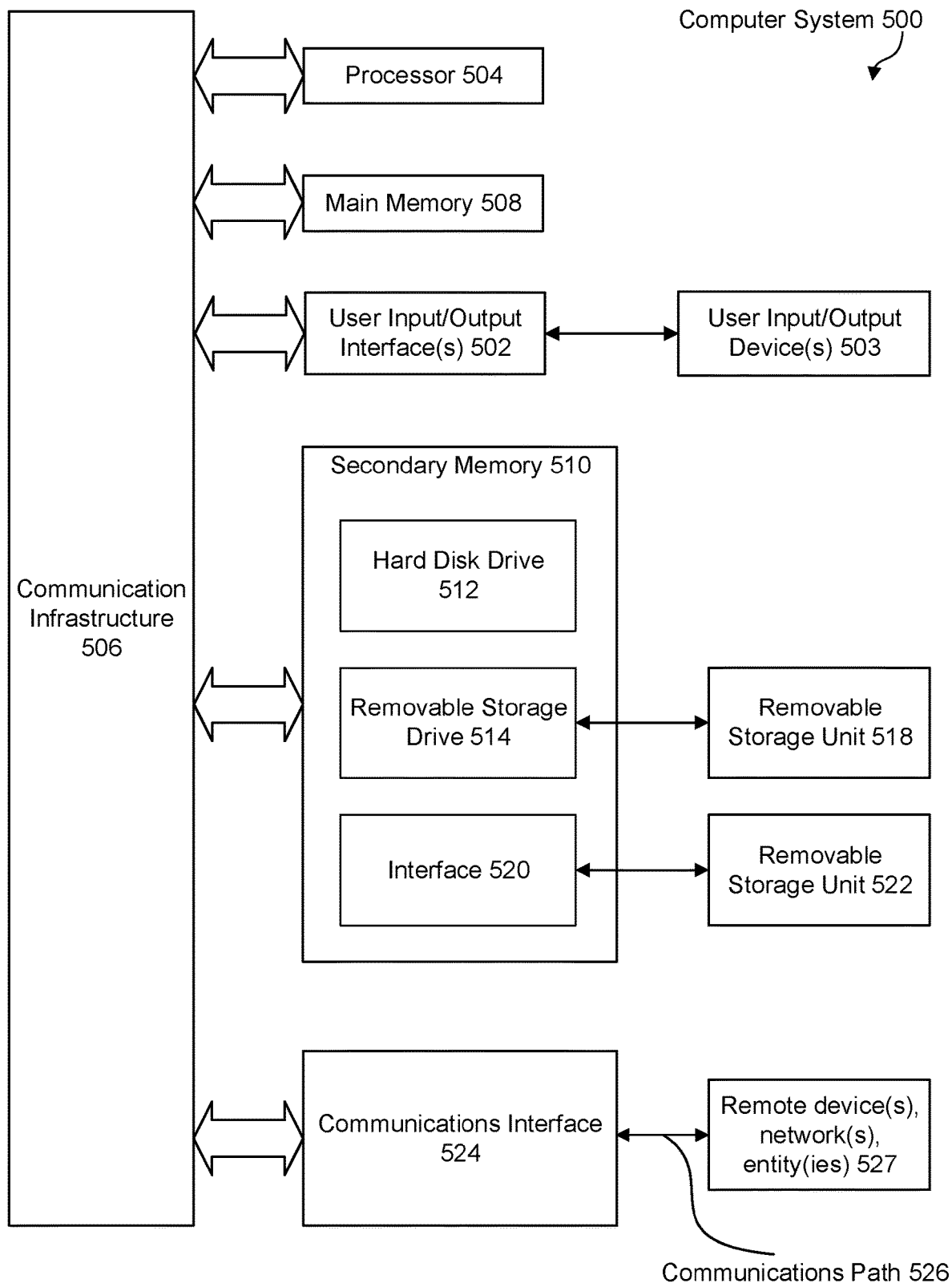
FIG. 5 is an illustration of an example computer system for implementing some aspects or portion(s) thereof of the disclosure provided herein, according to some embodiments.

Various aspects can be implemented, for example, using one or more computer systems, such as computer system 500 shown in FIG. 5. Computer system 500 can be any computer capable of performing the functions described herein for electronic device 100 including components, such as initiator 101, target 103, functional circuit 105, and error logger circuit 115 as shown in FIG. 1. Computer system 500 can also be any computer capable of performing the functions for error logger circuit 315, error logger circuit 345, and error logger circuit 365 as shown in FIGS. 3A, 3C, and 3D, for device 400 shown in FIG. 4, and for operations described in method 200 of FIG. 2. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for electronic device 100 including components such as initiator 101, target 103, functional circuit 105, error logger circuit 115 as shown in FIG. 1, or error logger circuit 315, error logger circuit 345, error logger circuit 365 as shown in FIGS. 3A, 3C, 3D, device 400 shown in FIG. 4, for operations described for method 200.

Computer system 500 may further include a communication or network interface 524. Communication interface 524 enables computer system 500 to communicate and interact with any combination of remote devices, remote networks, remote entities, etc. (individually and collectively referenced by reference number 527). For example, communication interface 524 may allow computer system 500 to communicate with remote devices 527 over communications path 526, which may be wired and/or wireless, and which may include any combination of LANs, WANs, the Internet, etc. Control logic and/or data may be transmitted to and from computer system 500 via communication path 526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

Figure 6:
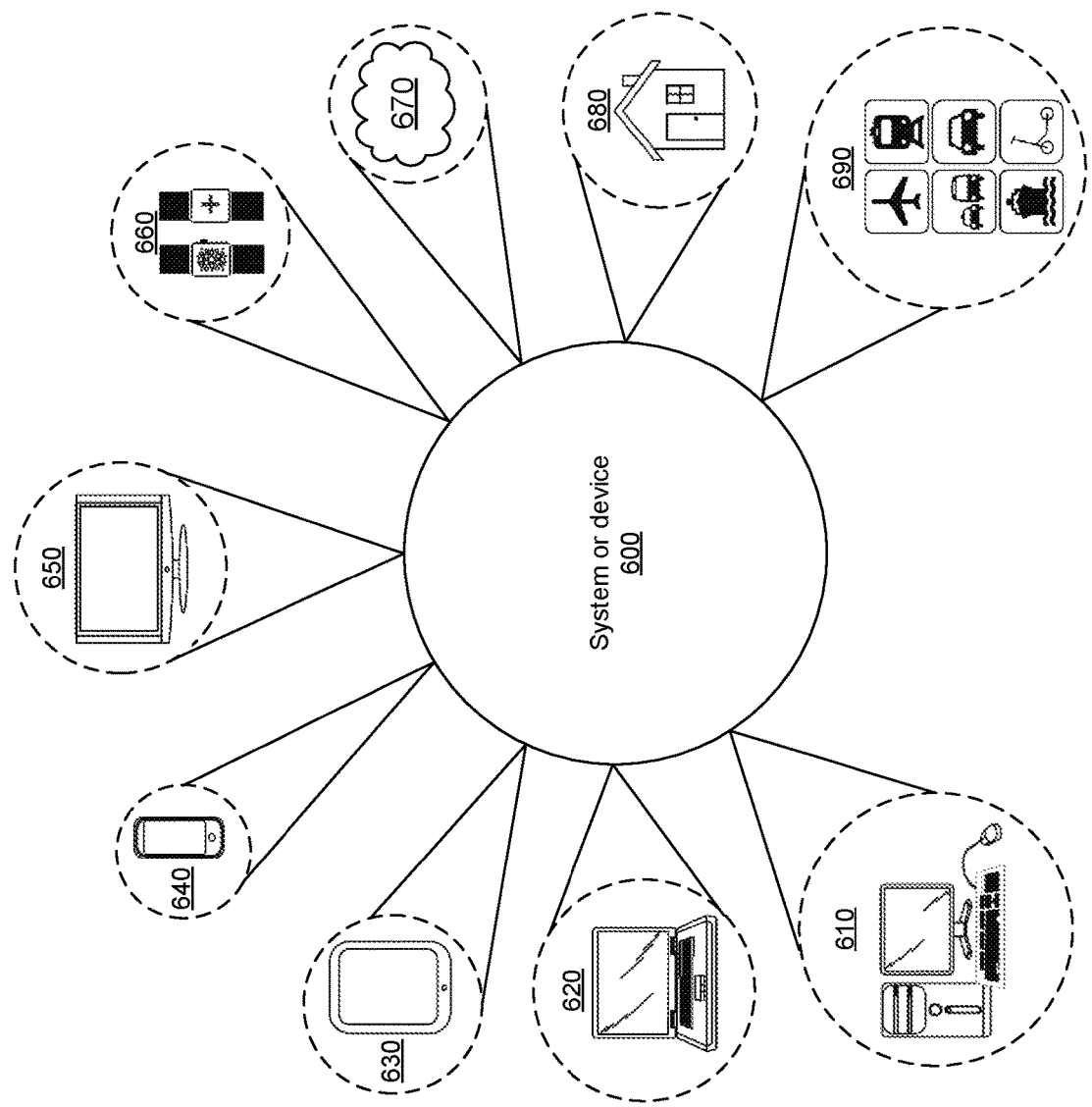
FIG. 6 is an illustration of exemplary systems or devices that can include the disclosed embodiments.

FIG. 6 is an illustration of exemplary systems or devices that can include the disclosed embodiments. System or device 600 can incorporate one or more of the disclosed embodiments in a wide range of areas. For example, system or device 600 can be implemented in one or more of a desktop computer 610, a laptop computer 620, a tablet computer 630, a cellular or mobile phone 640, and a television 650 (or a set-top box in communication with a television).

Also, system or device 600 can be implemented in a wearable device 660, such as a smartwatch or a health-monitoring device. In some embodiments, the smartwatch can have different functions, such as access to email, cellular service, and calendar functions. Wearable device 660 can also perform health-monitoring functions, such as monitoring a user's vital signs and performing epidemiological functions (e.g., contact tracing and providing communication to an emergency medical service). Wearable device 660 can be worn on a user's neck, implantable in user's body, glasses or a helmet designed to provide computer-generated reality experiences (e.g., augmented and/or virtual reality), any other suitable wearable device, and combinations thereof.

Further, system or device 600 can be implemented in a server computer system, such as a dedicated server or on shared hardware that implements a cloud-based service 670. System or device 600 can be implemented in other electronic devices, such as a home electronic device 680 that includes a refrigerator, a thermostat, a security camera, and other suitable home electronic devices. The interconnection of such devices can be referred to as the "Internet of Things" (IoT). System or device 600 can also be implemented in various modes of transportation 690, such as part of a vehicle's control system, guidance system, and/or entertainment system.

The systems and devices illustrated in FIG. 6 are merely examples and are not intended to limit future applications of the disclosed embodiments. Other example systems and devices that can implement the disclosed embodiments include portable gaming devices, music players, data storage devices, and unmanned aerial vehicles.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A device, comprising:
   an initiator;
   a target;
   a communication bus configured to couple the initiator to the target over a channel;

a functional circuit coupled to the channel and configured to perform a function associated with a transaction request from the initiator to the target, wherein the functional circuit comprises an error detection circuit configured to detect an error associated with the function performed by the functional circuit and to generate an error indicator signal to indicate that the error has been detected, wherein the error indicator signal is generated in a same clock cycle as the transaction request is sent to a component in a downstream direction to the target over the channel; and an error logger circuit coupled to the functional circuit, wherein the error logger circuit comprises a storage and an interruption circuit, the error logger circuit configured to receive the transaction request and further receive the error indicator signal from the error detection circuit and store information about the transaction request and information about the error received with the transaction request and the error indicator signal, wherein the interruption circuit is configured to assert an interrupt signal to be sent to the initiator at the same clock cycle as the transaction request is sent to the component in the downstream direction over the channel and at a same clock cycle as the error indicator signal is generated by the error detection circuit.

2. The device of claim 1, wherein the error logger circuit is configured to be in one of a state indicating no error is logged, a state indicating the error is logged, or a state indicating the error and other errors are logged.

3. The device of claim 1, wherein the information about the error comprises one or more of an error type, transaction details of the transaction request, a destination address of the transaction request, a communication bus state, and an identification of the functional circuit.

4. The device of claim 1, wherein the error logger circuit comprising the interruption circuit is enabled by the error indicator signal.

5. The device of claim 4, wherein the error logger circuit is configured to store the information about the error, and wherein a counter is configured to count a number of other errors associated with the function and detected by the error detection circuit.

6. The device of claim 1, wherein the interruption circuit is configured to assert the interrupt signal at the same clock cycle as the transaction request is sent to the component in the downstream direction over the channel without terminating the transaction request first.

7. The device of claim 1, wherein the error logger circuit is coupled to another channel of the communication bus and configured to receive another error indicator signal from an other error detection circuit and store information about another error detected by the other error detection circuit.

8. The device of claim 1, wherein the functional circuit is one of a plurality of functional circuits coupled to the channel, and wherein the error logger circuit is configured to receive error indicator signals from the plurality of functional circuits.

9. The device of claim 1, wherein the functional circuit further comprises an error shim circuit configured to terminate the transaction request and generate a transaction response in response to the error being detected by the error detection circuit.

10. The device of claim 1, wherein the error logger circuit is further configured to receive a configuration signal to enable reading the information about the error or to clear the information about the error.

11. The device of claim 1, wherein:
the functional circuit further comprises a demultiplexer, a security circuit, a multiplexer, or a power circuit;
the initiator comprises a processor, a memory access circuit, a hardware accelerator, or a network circuit;
the transaction request comprises a read request, a coherency request, or a write request;
the target comprises a memory device, a register file, a hardware queue storage device; and
the error can have an error type selected from a decode error, a security error, a power disconnect error, and a slave error.

12. An error logger circuit, comprising:
an error indicator receiving port configured to receive an error indicator signal from an error detection circuit coupled to a channel of a data communication bus coupling an initiator and a target, wherein the error detection circuit is configured to detect an error associated with a function performed by a functional circuit for a transaction request from the initiator to the target and to generate the error indicator signal to indicate that the error has been detected, wherein the error indicator signal is generated in a same clock cycle as the transaction request is sent to a component in a downstream direction to the target over the channel;
a transaction request receiving port configured to receive the transaction request;
an input port configured to receive information about the error associated with the function for the transaction request;
a storage circuit;
a controller coupled to the error indicator receiving port, the input port, and the storage circuit, wherein the controller is configured to:
enable the error logger circuit in response to the error indicator signal being received at the error indicator receiving port; and
store, in the storage circuit, the information about the error received at the input port and information about the transaction request received at the transaction request receiving port; and
an interruption circuit configured to assert an interrupt signal to be sent to the initiator at the same clock cycle as the transaction request is sent to the component in the downstream direction to the target over the channel.

13. The error logger circuit of claim 12, wherein the controller is in one of a state indicating no error is logged, a state indicating one error is logged, or a state indicating multiple errors are logged.

14. The error logger circuit of claim 12, wherein the information about the error comprises an error type, a destination address of the transaction request, a communication bus state, or an identification of the functional circuit.

15. The error logger circuit of claim 12, further comprising:
a counter configured to count a number of errors associated with the function.

16. A method, comprising:
receiving an error indicator signal from an error detection circuit coupled to a channel of a communication bus coupling an initiator and a target, wherein the error detection circuit is configured to detect an error associated with a transaction request between the initiator and target and to generate the error indicator signal to indicate that the error has been detected, wherein the error indicator signal is generated in a same clock cycle as the transaction request is sent to a component in a downstream direction to the target over the channel;

enabling an error logger circuit coupled to the channel;

receiving an error message including information about the error associated with the transaction request;

receiving the transaction request;

storing the received information about the error and information about the transaction request; and transmitting an interrupt signal generated by an interruption circuit of the error logger circuit to the initiator at the same clock cycle as the transaction request is sent to the component over the channel.

17. The method of claim 16, wherein the information about the error comprises an error type, a destination address of the transaction request, a communication bus state, or an identification of a functional circuit.

18. The method of claim 16, wherein the error is a first error, and the method further comprises:

counting a number of errors associated with the transaction request, wherein information about a first error associated with the transaction request is stored.

19. The method of claim 16, further comprising:

receiving a configuration signal to enable reading the information about the error or to clear the information about the error.

20. The error logger circuit of claim 12, wherein the functional circuit is one of a plurality of functional circuits coupled to the channel, and wherein the error logger circuit is configured to receive error indicator signals from the plurality of functional circuits.

* * * * *